United States Patent
Hsu et al.

(10) Patent No.: US 9,150,005 B2
(45) Date of Patent: Oct. 6, 2015

(54) LOW WATER-VAPOR PERMEABLE COMPOSITE FILM AND PACKAGING STRUCTURE

(75) Inventors: Jui-Hung Hsu, Changhua (TW); Ming-Cheng Feng, Maogangwei (TW); Jhih-Meng Tang, Taoyuan (TW); Dan-Cheng Kong, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 30 days.

(21) Appl. No.: 13/547,568

(22) Filed: Jul. 12, 2012

(65) Prior Publication Data

US 2013/0156994 A1     Jun. 20, 2013

(30) Foreign Application Priority Data

Dec. 15, 2011  (TW) .............................. 100146411 A

(51) Int. Cl.
*B32B 27/32* (2006.01)
*B32B 27/36* (2006.01)
*B32B 27/20* (2006.01)

(52) U.S. Cl.
CPC ................ *B32B 27/20* (2013.01); *B32B 27/32* (2013.01); *B32B 27/36* (2013.01); *B32B 2250/03* (2013.01);
(Continued)

(58) Field of Classification Search
CPC  B32B 27/36; B32B 2250/03; B32B 2250/42; B32B 2255/00; B32B 2255/20; B32B 27/32; B32B 9/005; H01L 51/0097; H01L 51/5237; H01L 2251/5338; H01L 33/52; Y10T 428/1352; Y10T 428/31786; Y10T 428/31855; Y10T 428/31909; Y10T 428/31913; Y10T 428/3192

USPC ............... 428/35.7, 480, 500, 515, 516, 518; 313/512, 511

See application file for complete search history.

(56) References Cited

U.S. PATENT DOCUMENTS 6,268,695 B1   7/2001   Affinito
6,503,617 B2   1/2003   Jacobsen et al.
(Continued)

FOREIGN PATENT DOCUMENTS

CN       1579742 A    2/2005
CN     101041277 A    9/2007
(Continued)

OTHER PUBLICATIONS

Bishop, Charles A. (2011). Vacuum Deposition onto Webs, Films, and Foils (2nd Edition). Elsevier. (Online version available at http://app.knovel.com/hotlink/toc/id:kpVDWFFE02/vacuum-deposition-onto).*

(Continued)

*Primary Examiner* — Walter B Aughenbaugh
(74) *Attorney, Agent, or Firm* — Muncy, Geissler, Olds & Lowe, P.C.

(57) ABSTRACT

Provided is a low water-vapor permeable composite film, which includes a 3-layered co-extruded biaxial-oriented film formed of polyester films or polypropylene films including a first layer, a second layer and a third layer stacked in sequence. The first layer further includes an anti-block agent. An alternate structure including a plurality of organic protection layers and a plurality of inorganic layers are formed on the 3-layered co-extruded biaxial-oriented film. The plurality of organic protection layers and the plurality of inorganic layers are stacked alternately. The inorganic layers are formed by atom layer deposition.

16 Claims, 2 Drawing Sheets

(52) U.S. Cl.
CPC ......... *B32B 2250/42* (2013.01); *B32B 2255/10* (2013.01); *B32B 2255/20* (2013.01); *B32B 2307/518* (2013.01); *B32B 2553/00* (2013.01); *Y10T 428/239* (2015.01); *Y10T 428/24975* (2015.01); *Y10T 428/24992* (2015.01); *Y10T 428/269* (2015.01); *Y10T 428/3192* (2015.04); *Y10T 428/31515* (2015.04); *Y10T 428/31544* (2015.04); *Y10T 428/31551* (2015.04); *Y10T 428/31663* (2015.04); *Y10T 428/31786* (2015.04); *Y10T 428/31855* (2015.04); *Y10T 428/31909* (2015.04); *Y10T 428/31913* (2015.04)

(56) References Cited

U.S. PATENT DOCUMENTS

| | | | |
|---|---|---|---|
| 6,740,394 | B2 | 5/2004 | Jacobsen et al. |
| 7,635,525 | B2 | 12/2009 | Iwanaga |
| 7,709,094 | B2 | 5/2010 | Kong et al. |
| 7,858,171 | B2 | 12/2010 | Kawashima |
| 2003/0184219 | A1* | 10/2003 | Duggal et al. ............ 313/506 |
| 2004/0194691 | A1 | 10/2004 | George |
| 2005/0285521 | A1* | 12/2005 | Menda ..................... 313/512 |
| 2008/0221806 | A1 | 9/2008 | Bryant et al. |
| 2009/0278454 | A1 | 11/2009 | Fedorovskaya et al. |
| 2010/0089636 | A1* | 4/2010 | Ramadas et al. ............ 174/521 |
| 2010/0297798 | A1 | 11/2010 | Adriani et al. |
| 2011/0049730 | A1 | 3/2011 | Schmid et al. |

FOREIGN PATENT DOCUMENTS

| | | |
|---|---|---|
| CN | 101306589 A | 11/2008 |
| CN | 100576596 C | 12/2009 |
| CN | 102157591 A | 8/2011 |
| CN | 102214803 A | 10/2011 |
| JP | 2010-105321 A | 5/2010 |
| TW | 187074 | 7/1992 |
| TW | 200916313 A | 4/2009 |
| TW | I309893 | 5/2009 |
| TW | 201007777 | 2/2012 |
| WO | WO 2009005975 A1 * | 1/2009 |

OTHER PUBLICATIONS

Yam, Kit L. (2009). Wiley Encyclopedia of Packaging Technology (3rd Edition). John Wiley & Sons. (Online version available at http://app.knovel.com/hotlink/toc/id:kpWEPTE002/wiley-encyclopedia-packaging).*

Extance, A., (2009). Progress in UV-Cured Adhesives. SpecialChem. (Online version available at http://www.specialchem4adhesives.com/home/editorial.aspx?id=3081).*

MacDonald, W.A., Looney, M.K., MacKerron, D., Eveson, R. Adam, R. Hashimoto, K., Rakos, K., "Latest Andvances in Substrates for Flexible Electronics," Journal of SID, 15/12 (2007). (Online version available at http://www2.dupont.com/Displays/en_US/assets/downloads/pdf/WP_Adv_in_Substrates.pdf).*

Jin, S.. B., Kim, Y. S., Choi, In. S., and Han, J.G., "Characterization of silcon oxide gas barrier films with controlling to the ion current density (ion flux) by plasma enhanced chemical vapor deposition." Thin solid films. vol. 518(2010) p. 6385-6389.

Zhang, Y., Liu Q., and Lu Y., "Gas barrier properties of natural rubber/kaolin composites perpared by melt blending," Applied Clay Science, 50(2010) pp. 255-259.

Taiwan Office Action for Taiwan Application No. 100146411 dated Sep. 12, 2013.

* cited by examiner

LOW WATER-VAPOR PERMEABLE COMPOSITE FILM AND PACKAGING STRUCTURE

All related applications are incorporated by reference. The present application is based on, and claims priority from, Taiwan (International) Application Serial Number No. 100146411, filed on Dec. 15, 2011, the disclosure of which is hereby incorporated by reference herein in its entirety.

BACKGROUND

1. Technical Field

The present disclosure relates to a low water-vapor permeable composite film. More particularly, the present disclosure relates to a low water-vapor permeable composite film which is flexible and has high transparency.

2. Description of the Related Art

Air, water vapor and oxygen, in particular water vapor, are the main causes for the degradation of the active layer and low work function electrodes in optoelectronic devices. Thus, a low water-vapor permeable layer capable of blocking water vapor is needed for optoelectronic devices, such that the performance and life span of the optoelectronic devices are capable of being maintained and extended.

Among common materials such as plastics, glass and metals, plastics such as polyimide, polynorbornene or polyethylene naphthalate have poor water vapor barrier properties and are only suitable for anti-scratch usages in optoelectronic devices. Although glass has better water vapor barrier properties, its disadvantages of high energy consumption in fabrication, brittleness, no flexibility, bulk and heavy weight limit its applications. Metals such as aluminum foil have disadvantages of high energy consumption in fabrication, not being recyclable, high conductivity and opacity. These disadvantages make metal foils not suitable for the water vapor barrier layers in optoelectronic devices.

Since single material alone cannot meet the requirements of water vapor barrier layer in optoelectronic devices, some composite materials, for example, polymer substrates vacuum evaporated with metal or silicon oxide films, have been proposed. The composite materials have better water vapor barrier properties than plastics and are also flexible. However, the water vapor barrier properties and opacity of these composite materials still fall short of the requirements of the gas barrier layer in optoelectronic devices.

Therefore, a low water-vapor permeable film which has high transparency, good water vapor barrier properties and high flexibility is needed for optoelectronic devices.

BRIEF SUMMARY

A low water-vapor permeable composite film is provided, in which comprises: a 3-layered co-extruded biaxial-oriented film formed of polyester films or polypropylene films comprising a first layer, a second layer and a third layer stacked in sequence, and an alternating layer structure comprising a plurality of organic protection layers and a plurality of inorganic layers formed on the 3-layered co-extruded biaxial-orient film, wherein the plurality of organic protection layers and the plurality of inorganic layers are stacked alternately, and the inorganic layers are formed by atom layer deposition. When the 3-layered co-extruded biaxial-oriented film is formed of polyester films, the first layer comprises polyethylene terephthalate, glycol-modified polyethylene terephthalate, acid-modified polyethylene terephthalate, glycol-modified polycyclohexanedimethylene terephthalate or combinations thereof, the second layer comprises poly(ethylene terephthalate), poly(propylene terephthalate), polybutylene terephthalate, polyethylene naphthalate or combinations thereof, and the third layer comprises polyethylene terephthalate, glycol-modified polyethylene terephthalate, acid-modified polyethylene terephthalate, glycol-modified polycyclohexanedimethylene terephthalate or combinations thereof, and the first layer further contains an anti-block agent. When the 3-layered co-extruded biaxial-orient film is formed of polypropylene films, the first layer comprises polypropylene, ethylene-propylene copolymer, ethylene-propylene-butylene copolymer, high density polyethylene or combinations thereof, the second layer comprises polypropylene, ethylene-propylene copolymer or combinations thereof, and the third layer comprises polypropylene, ethylene-propylene copolymer, ethylene-propylene-butylene copolymer, high density polyethylene or combinations thereof, and the first layer further contains an anti-block agent.

A packaging structure is also provided, in which comprises: an optoelectronic device; and the low water-vapor permeable composite film described above, which is adhered to the optoelectronic device.

BRIEF DESCRIPTION OF THE DRAWINGS

The invention will now be described, by way of example, with reference to the accompanying drawings, in which.

DETAILED DESCRIPTION

It is understood that the following disclosure provides many different embodiments, or examples, for implementing different features of the disclosure. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

A low water-vapor permeable composite film according to the exemplary embodiments of the present disclosure is provided. The low water-vapor permeable composite film may have high transparency and flexibility with effective barrier to water vapor, and therefore is capable of being used as a desired water vapor barrier packaging film in various optoelectronic devices.

Figure 1:
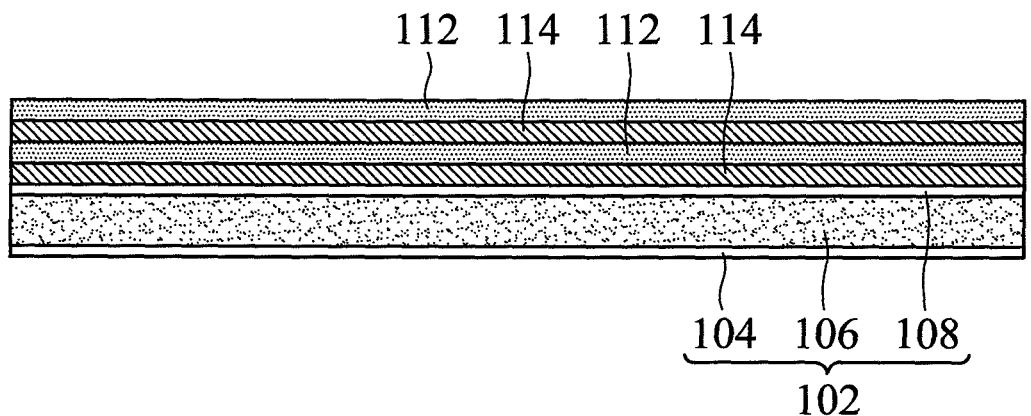
FIG. 1 illustrates a cross-section view of a low water-vapor permeable composite film according to an exemplary embodiment of the present disclosure.

Referring to FIG. 1, illustrated is a low water-vapor permeable composite film according to an embodiment of the present disclosure. The low water-vapor permeable composite film may include a 3-layered co-extruded biaxial-oriented film 102 formed of polyester films or polypropylene films and an alternate structure formed of a plurality of organic protecting layers 112 and a plurality of inorganic layers 114.

The 3-layered co-extruded biaxial-oriented film 102 may comprise a first layer 104, a second layer 106 and a third layer 108 stacked in sequence. In an embodiment, the co-extruded biaxial-oriented film 102 may be a 3-layered biaxial-oriented film. The 3-layered co-extruded biaxial-oriented film 102 may be formed of polymer films stretched in two perpendicular directions. Thus, by using the biaxial stretching technology, the arrangement of the polymer chain is substantially changed and the physical properties such as strength and toughness of the 3-layered co-extruded biaxial-oriented film 102 may be effectively improved. In addition, the biaxial-oriented 3-layered co-extruded film 102 may have high transparency. The 3-layered co-extruded film 102 may be formed by performing a melting process using an extruder. For example, the formation of the 3-layered co-extruded film may comprise one or more of the following steps: introducing materials of each of the three layers into the extruder, extruding them through a T-shaped molding head at a temperature ranging from 275° C. to 300° C., and then passing the molded materials through a casting drum at a temperature ranging from 15° C. to 40° C. Then, the 3-layered co-extruded film is bi-axially stretched. For example, the 3-layered co-extruded film is stretched in a hot-air circulating oven in both machine direction and traverse direction simultaneously or step by step. In an embodiment, the bi-axial stretching step may be a continuous two-stage process comprising: stretching in the machine direction (MD direction) at a stretch ratio of about 2:1 to about 4:1 with hot rollers at a temperature range of 80° C. to 120° C.; and stretching in the transverse direction (TD direction) at a stretch ratio of about 3:1 to about 6:1 in the oven at a temperature range of 80° C. to 120° C. For example, the 3-layered co-extruded biaxial-oriented film 102 may be polypropylene films which are co-extruded at a temperature range of 200° C. to 250° C, and then cooled to 15° C. to 50° C. on the casting drum, and stretched in machine direction at a stretch ratio of about 4:1 to about 6:1 at a temperature range of 80° C. to 135° C. and in the transverse direction at a stretch ratio of about 6:1 to about 10:1 in the oven at a temperature range of 80° C. to 120° C.

In an embodiment, when the 3-layered co-extruded biaxial-oriented film 102 is formed of polyester films, the first layer 104 may comprise polyethylene terephthalate (PET), glycol-modified polyethylene terephthalate (PETG), acid-modified polycyclohexanedimethylene terephthalate (PCTA), glycol-modified polycyclohexanedimethylene terephthalate (PCTG) or combinations thereof. In another embodiment, when the 3-layered co-extruded biaxial-orient film 102 is formed of polypropylene films, the first layer 104 may comprise polypropylene (PP), ethylene-propylene copolymer, ethylene-propylene-butylene copolymer, high density polyethylene (HDPE) or combinations thereof.

In addition, the 3-layered co-extruded biaxial-orient film 102 is either formed of polyester films or polypropylene films, and the first layer 104 may further comprises an additives such as an anti-block agent. The anti-block agent may comprise silica, magnesium silicate, calcium carbonate, polysiloxane, polytetrafluoroethene or combinations thereof. The anti-block agent may reduce the friction between films. In an embodiment, the concentration of the anti-block agent is between 100 ppm and 3000 ppm. Excess of the anti-block agent would lead to decreased transparency of the 3-layered co-extruded biaxial-oriented film 102. In an embodiment, the first layer may have a thickness of between 1 μm and 5 μm.

In an embodiment, when the 3-layered co-extruded biaxial-oriented film 102 is formed of polyester films, the second layer 106 may comprise polyethylene terephthalate (PET), polypropylene terephthalate (PPT), polybutylene terephthalate (PBT), polyethylene naphthalate (PEN) or combinations thereof. In another embodiment, when the 3-layered co-extruded biaxial-orient film 102 is formed of polypropylene films, the second layer 106 may comprise polypropylene (PP), ethylene-propylene copolymer or combinations thereof. It should be noted that no matter the 3-layered co-extruded biaxial-orient film 102 is either formed of polyester films or propylene films, the second layer 106 does not comprise any additives or dopants therein. The second layer 106 may be relatively thick, for example, the thickness may be between 13 μm and 240 μm, for providing adequate mechanical support as well as facilitating co-extrusion and biaxial stretching of the 3-layered co-extruded biaxial-oriented film 102.

The third layer 108 may comprise the same or different material with the second layer 106 and the first layer 104. The third layer 108 may have a relatively lower viscosity than that of the second layer 106 for preventing a turbulent flow during the co-extrusion and biaxial stretching processes. The turbulent flow would lead to undesired mixing of the third layer 108 and the second layer 106. In an embodiment, when the 3-layered co-extruded biaxial-oriented film 102 is formed of polyester films, the third layer 108 may comprise polyethylene terephthalate (PET), glycol-modified polyethylene terephthalate (PETG), acid-modified polycyclohexanedimethylene terephthalate (PCTA), glycol-modified polycyclohexanedimethylene terephthalate (PCTG) or combinations thereof. In another embodiment, when the 3-layered co-extruded biaxial-oriented film 102 is formed of polypropylene films, the third layer 108 may comprise polypropylene (PP), ethylene-propylene copolymer, ethylene-propylene-butylene copolymer, high density polyethylene (HDPE) or combinations thereof Note that the third layer 108 does not comprise any additives or dopants therein for forming a smooth surface, and thereby films coated on the third layer 108 may have a better film quality. The third layer 108 may have a thickness of between 1 μm and 5 μm. In an embodiment, corona treatment may be performed on the third layer 108.

Since the three layers of the 3-layered co-extruded biaxial-oriented film 102 are all formed of polymers having low water vapor permeability with improved physical properties (e.g., strength and toughness) resulting from the biaxial stretching, the 3-layered co-extruded biaxial-oriented film 102 may have lower water vapor permeability than that of normal plastic materials and have sufficient mechanical strength to be used as a substrate. In an embodiment, the 3-layered co-extruded biaxial-oriented film 102 may have a water vapor permeation rate of 1 $g/m^2$ per day to 100 $g/m^2$ per day. In addition, since the additive such as the anti-block agent is only added into the first layer 104, only a low addition concentration of the anti-block agent is needed. Accordingly, a good anti-block property for the 3-layered co-extruded biaxial-orient film 102 may be provided without influencing optical properties of the 3-layered co-extruded biaxial-oriented film 102.

A plurality of organic protection layers 112 and a plurality of inorganic layers 114 are formed on the third layer 108 of the 3-layered co-extruded biaxial-oriented film 102 alternately to form an alternating layer structure. In an embodiment, the organic protection layers 112 may be a polymer layer which is cross-linked by multi-functional monomers and oligomers. For example, the multi-functional monomers, the oligomers and an initiator may be mixed as starting materials and are polymerized through UV irradiation or heating, and the organic protection layer 112 is the reaction product. The multi-functional monomers may comprise acrylate, epoxy acrylate, urethane acrylate or combinations thereof. The oligomers may be a polymerization product of the multi-functional monomers with low degree of polymerization. The oligomers may provide sufficient viscosity of the organic protection layer 112 for adhesion on the 3-layered co-extruded biaxial-oriented film 102 and the organic layers 114. The oligomers may be oligomerized from the multi-functional monomers through UV irradiation or heating. In an embodiment, the initial weight ratio of the oligomers to the multi-functional monomers in the polymerization reaction of the organic protection layer 112 may be between 8:1 and 2:1. In an embodiment, the initiator may be a radical initiator selected from the group consisting of benzophenone, 1-hydroxy cyclohexylphenyl ketone and diphenyl(2,4,6-trimethylbenzoyl)phosphine oxide. In another embodiment, the initiator may be a cation initiator selected from the group consisting of diarylindonium salts ($Ar_2I^+X^-$), triaryl sulfonium salts ($Ar_3S^+X^-$), ferrocenium complexes and aryl diazonium salts. The content of initiator may be between 0.5 wt % to 10 wt %. In other embodiments, the organic protection layer 112 may be polyvinylidene chloride, polyvinyl alcohol, ethylene-vinyl alcohol copolymer, transparent esters or combinations thereof The organic protection layer 112 may have a thickness of between 1 μm and 8 μm, or between 1 μm and 5 μm. The organic protection layer 112 may function as a protection layer or a primer layer of the atomic layer deposited inorganic layer 114, and therefore can enhance the adhesion of the inorganic layers 114.

The inorganic layers 114 may comprise transparent inorganic oxides or transparent inorganic nitrides formed by atomic layer deposition (ALD). In an embodiment, the inorganic layers 114 may comprise aluminum oxide, zinc oxide, zirconium oxide, hafnium oxide, silicon nitride, indium nitride or combinations thereof Each layer of the inorganic layers 114 may have a thickness of 120 atomic layers to 200 atomic layers, or 180 atomic layers to 200 atomic layers. The ALD process may comprise the following steps: introduce metal-contained precursor into ALD chamber and allow the precursor to adsorb onto the substrates to form a monolayer of molecules; introduce the second precursor, for example, water vapor, to react with the metal-contained precursors to form a single atomic layer of inorganic oxide or nitride; repeat the above steps until the total thickness of the atomic deposition layers reach a desired value. In an embodiment, each layer of the inorganic layers 114 may have a thickness of between 10 nm and 50 nm.

In an embodiment, as shown in FIG. 1, the lowest inorganic layer 114 may be directly deposited onto the third layer 108 of the 3-layered co-extruded biaxial-oriented film 102 by ALD because the third layer 108 of the 3-layered co-extruded biaxial-oriented film 102 does not comprise any additive agents or dopants and has a smooth surface. The lowest organic protection layer 112 may be formed on the lowest inorganic layer 114, and the uppermost organic protection layer 112 may be the top layer of the 3-layered co-extruded biaxial-oriented film 102. The uppermost organic protection layer 112 may function as a protection layer for preventing degradation of the inorganic layers 114. In other words, in this embodiment, the alternating layer structure 103 may have n layers of the organic protection layers 112 and n layers of inorganic layers, wherein "n" is any positive integer more than or equal to 2.

Since the inorganic layers 114 are formed by ALD, the inorganic layers 114 may have high step coverage and ultra low pinhole density. Thus, the inorganic layers 114 may have an excellent water-vapor barrier performance and are very thin, and may significantly enhance the synergic effect of water-vapor barrier with the organic protection layers 112. Furthermore, since the inorganic layers 114 may be very thin, the inorganic layers may have improved transparency and flexibility, and may not possess the disadvantages of conventional inorganic oxides such as brittleness. Similarly, the alternating layer structure 103 may have excellent water-vapor barrier, flexibility and transparency.

Thus, the low water-vapor permeable composite film including the alternating layer structure 103 and the 3-layered co-extruded biaxial-oriented film 102 not only has excellent water-vapor barrier, high flexibility and high transparency, but also has sufficient strength and toughness. This can meet the requirements for packaging materials of optoelectronic devices. For example, the low water-vapor permeable composite film may have a water-vapor transmission rate less than 0.02 g/m2 per day, and have a full spectrum transmittance greater than 80%. In addition, since the low water-vapor permeable composite film is formed of very thin inorganic layers and organic polymers, it can be much lighter than glass and metal foils. The low water-vapor permeable composite film may meet thin and lightweight requirements of optoelectronic devices.

Figure 2:
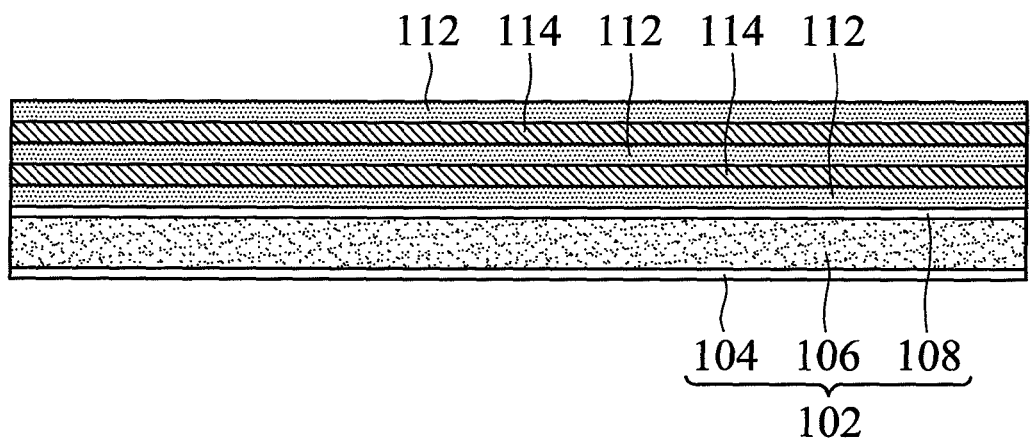
FIG. 2 illustrates a cross-section view of a low water-vapor permeable composite film according to another exemplary embodiment of the present disclosure.

Referring to FIG. 2, illustrated is a low water-vapor permeable composite film according to another embodiment of the present disclosure. In this embodiment, the same numeral references represent same or similar devices in preceding embodiments. As shown in FIG. 2, a plurality of organic protection layers 112 and a plurality of inorganic layers 114 are formed on the third layer 108 of the 3-layered co-extruded biaxial-oriented film 102 alternately. The lowest organic protection layer 112 may be directly coated onto the third layer 108 of the 3-layered co-extruded biaxial-oriented film 102, and the lowest inorganic layer 114 may be formed on the lowest organic protection layer 112. In addition, the uppermost organic protection layers 112 may be disposed on the uppermost inorganic layer 114 for providing physical protection and preventing degradation of the inorganic layers 114. In other words, in this embodiment, the alternating layer structure 103 may have n+1 layers of the organic protection layers 112 and n layers of inorganic layers, wherein "n" is any positive integers more than or equal to 2.

As described in preceding embodiments, since the inorganic layers 114 are formed by ALD, the deposition of inorganic layers 114 may have high step coverage and ultra low pinhole density. Thus, the inorganic layers 114 may have excellent water-vapor barrier performance and are very thin and can significantly enhance the synergic effect of water-vapor barrier together with the organic protection layers 112. Furthermore, the inorganic layers 114, the organic protection layers 112 and the 3-layered co-extruded biaxial-oriented film 102 all have excellent water-vapor barrier, flexibility and transparency. Thus, the low water-vapor permeable composite film shown in FIG. 2 not only has excellent water-vapor barrier, high flexibility and high transparency, but also has sufficient strength and toughness. The low water-vapor permeable composite film may meet the requirements of packaging materials of optoelectronic devices. For example, in this embodiment, the low water-vapor permeable composite film may have a water-vapor transmission rate of less than 0.02 g/m$^2$ per day, and have a full spectrum transmittance of greater than 80%.

Figure 3:
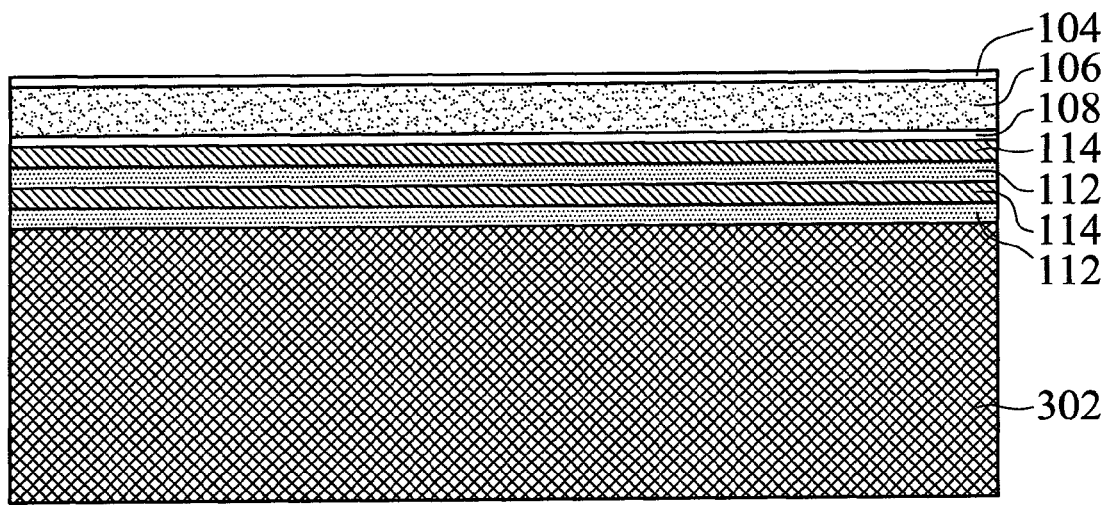
FIG. 3 illustrates a cross-section view of a packaging structure according to an exemplary embodiment of the present disclosure.

Referring to FIG. 3, illustrated is a packaging structure according to one embodiment of the present disclosure. The packaging structure may comprise an optoelectronic device 302 and a low water-vapor permeable composite film adhered thereon. In an embodiment, the optoelectronic device may be an organic light emitting diode (OLED), thin-film solar cell, dye-sensitized solar cell, e-paper or combinations thereof. The low water-vapor permeable composite film may be the one illustrated in the preceding embodiments (as shown in FIG. 1 or 2). For example, the low water-vapor permeable composite film may comprise the extruded biaxial-oriented film 302 (including layers 104, 106, 108), a plurality of organic protection layers 112 and a plurality of inorganic layers 114. In this embodiment, the low water-vapor permeable composite film may be adhered to the optoelectronic device 302 via the upper-most organic protection layer 112. Since the low water-vapor permeable composite film may have high transparency and high flexibility, the low water-vapor permeable composite film may block the penetration of water vapor and air without influencing the light-emitting and light-absorbing properties of the optoelectronic device 302. Furthermore, the low water-vapor permeable composite film may also provide sufficient physical protection and have good anti-block property for the optoelectronic device 302. The low water-vapor permeable composite film and the optoelectronic device 302 may be fabricated separately. For example, the low water-vapor permeable composite film may be adhered to the optoelectronic device 302 after the optoelectronic device 302 has been fabricated.

Figure 4:
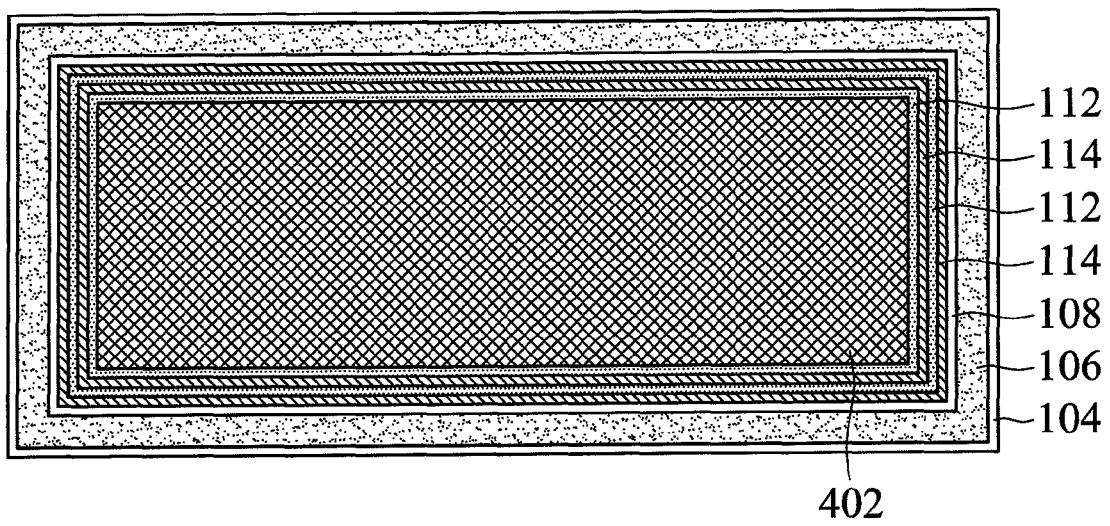
FIG. 4 illustrates a cross-section view of a packaging structure according to another exemplary embodiment of the present disclosure.

Referring to FIG. 4, illustrated is a packaging structure according to another embodiment of the present disclosure. The packaging structure may comprise an optoelectronic device 402 and a low water-vapor permeable composite film adhered thereon. The low water-vapor permeable composite film may be the one illustrated in the preceding embodiments (as shown in FIG. 1 or 2). For example, the low water-vapor permeable composite film may comprise the extruded biaxial-oriented film 102 (including layers 104, 106, 108), a plurality of organic protection layers 112 and a plurality of inorganic layers 114. Since the low water-vapor permeable composite film is flexible, it may wrap the whole optoelectronic device 402. The low water-vapor permeable composite film may block the penetration of water vapor and air without influencing the light-emitting and light-absorbing properties of the optoelectronic device 402. Furthermore, the low water-vapor permeable composite film may also provide sufficient physical protection and good anti-block properties for the optoelectronic device 402. The low water-vapor permeable composite film and the optoelectronic device 102 may be fabricated separately. For example, the low water-vapor permeable composite film may be adhered to the optoelectronic device 402 after the optoelectronic device 402 has been fabricated.

EXAMPLE 1

The materials of the first layer, the second layer and the third layer were introduced into an extruder. After melting and co-extrusion processes, a 3-layered co-extruded film was formed. The first layer was PET, which contained 600 ppm of silica (anti-block agent). The second layer and the third layer were PET. In this co-extrusion process, the three layers were melted and co-extruded by a T-shaped molding head at 275° C. and cooled to 20° C. on a casting drum, and then the 3-layered co-extruded film was formed. Next, the 3-layered co-extruded film was bi-axially stretched (stretched in the MD direction at a stretch ratio of 3:1, and stretched in the TD direction at a stretch ratio of 3.5:1) to form the 3-layered co-extruded biaxial-riented film. The 3-layered co-extruded biaxial-oriented film had a total thickness of 188 μm, in which the first layer had a thickness of 1 μm and the third layer had a thickness of 1 μm. Then, corona treatment was performed on the first layer and the third layer. Then, by using trimethyl aluminum and water as the precursor, 200 cycles of atomic layer deposition of aluminum oxide were deposited on the third layer at a temperature of 120° C. to form the inorganic layer. Next, a mixture of 97% of acrylate UV glue, 1.5 wt % of 1-hydroxy cyclohexylphenyl ketone (first photoinitiator) and 1.5 wt % of diphenyl(2,4,6-trimethylbenzoyl)phosphine oxide (second photoinitiator) were coated on the top surface of the aluminum oxide layer and then cured by UV irradiation. Thus, the organic protection layer was formed. In this organic protection layer, the weight ratio of the oligomers to the multi-functional propylene monomers was 8:1. Then, the above formation steps of the organic protection layer and the inorganic layer were repeated and a stacked structure of the 3-layered co-extruded biaxial-oriented film/aluminum oxide/polyacrylate/aluminum oxide/polyacrylate was formed. The stacked structure was the low water-vapor permeable composite film. The low water-vapor permeable composite film had a water vapor transmission rate of 0.017 g/m$^2$ per day and a full spectrum optical transmittance of 92% under the ASTM F1249 standard test method.

EXAMPLE 2

The same procedures as in Example 1 were repeated for Example 2, except that the first layer of the co-extruded film was polypropylene containing 600 ppm of silica doped therein and the second layer and the third layer were polypropylene. The biaxially stretching step was comprised of stretching in the MD direction at a stretch ratio of 5:1 and stretching in the TD direction at a stretch ratio of 8:1. The 3-layered co-extruded biaxial-oriented polypropylene film had a total thickness of 50 μm, in which the first layer had a thickness of 1 μm and the third layer had a thickness of 1 μm. The low water-vapor permeable composite film had a water-vapor transmission rate of 0.010 g/m$^2$ per day and a full spectrum optical transmittance of 88% under the ASTM F1249 standard test method.

EXAMPLE 3

The same procedures as in Example 1 were repeated for Example 2, except that the first layer was polypropylene containing 600 ppm of silica and the second layer was polypropylene, and the third layer was ethylene-propylene copolymer. The biaxial stretching step was comprised of stretching in the MD direction at a stretch ratio of 5:1 and stretching in the TD direction at a stretch ratio of 8:1. The 3-layered co-extruded biaxial-oriented film had a total thickness of 50 μm, in which the first layer had a thickness of 1 μm and the third layer had a thickness of 1 μm. The low water-vapor permeable composite film had water vapor transmission rate of 0.006 g/m$^2$ per day and a full spectrum optical transmittance of 81% under the ASTM F1249 standard test method.

EXAMPLE 4

Corona treatment was performed on the surfaces of the first layer and the third layer of the 3-layered co-extruded biaxial-oriented film obtained in Example 1. Then, by using trimethyl aluminum and water as the precursor, 200 atomic deposition layers of aluminum oxide were deposited on the third layer and the first layer at a temperature of 120° C. Corona treatment was performed on the surfaces of the first layer and the third layer of the 3-layered co-extruded biaxial-oriented film obtained in Example 1. Then, by using trimethyl aluminum and water as the precursor, 200 atomic deposition layers of aluminum oxide were deposited on the third layer and the first layer at a temperature of 120° C. to form the inorganic layer. Next, a mixture of 97% of acrylate UV glue, 1.5 wt % of 1-hydroxy cyclohexylphenyl ketone (first photoinitiator) and 1.5 wt % of diphenyl(2,4,6-trimethylbenzoyl)phosphine oxide (second photoinitiator) were coated on the top surface of the aluminum oxide of the third layer and then cured by UV irradiation. Thus, the organic protection layer was formed. In this organic protection layer, the weight ratio of the oligomers to the multi-functional propylene monomers was 8:1. Thus, a stacked structure of polyacrylate/aluminum oxide/PET/aluminum oxide was formed, which is referred as the first water-vapor barrier film. Next, the same steps of the formation of the organic protection layer and the inorganic layer were repeated. A stacked structure of polyacrylate/aluminum oxide/PET/aluminum oxide was formed again, which are referred to as the second water-vapor barrier film. Then, the first and the second water-vapor barrier films were adhered to each other with the aluminum oxide sides faced in by using polyacrylate as the adhesion agent, and a third water-vapor barrier film was formed. The third water-vapor barrier film had a water vapor transmission rate of 0.0036 g/m$^2$ per day and a full spectrum transmittance of 90% under the ASTM F1249 standard test method. to form the inorganic layer. Next, a mixture of 97% of acrylate UV glue, 1.5 wt % of 1-hydroxy cyclohexylphenyl ketone (first photoinitiator) and 1.5 wt % of diphenyl(2,4,6-trimethylbenzoyl)phosphine oxide (second photoinitiator) were coated on the top surface of the aluminum oxide of the third layer and then cured by UV irradiation. Thus, the organic protection layer was formed. In this organic protection layer, the weight ratio of the oligomers to the multi-functional propylene monomers was 8:1. Thus, a stacked structure of polyacrylate/aluminum oxide/PET/aluminum oxide was formed, which is referred as the first water-vapor barrier film. Next, the same steps of the formation of the organic protection layer and the inorganic layer were repeated. A stacked structure of polyacrylate/aluminum oxide/PET/aluminum oxide was formed again, which are referred to as the second water-vapor barrier film. Then, the first and the second water-vapor barrier films were adhered to each other with the aluminum oxide sides faced in by using polyacrylate as the adhesion agent, and a third water-vapor barrier film was formed. The third water-vapor barrier film had a water vapor transmission rate of 0.0036 g/m$^2$ per day and a full spectrum transmittance of 90% under the ASTM F1249 standard test method.

Although different materials of the first layer, the second layer and the third layer were used in Examples 1-3, each of the low water-vapor permeable composite films in Examples 1-3 had a water vapor transmission rate of less than 0.02 g/m$^2$ per day, and the water vapor transmission rate can be down to 0.006 g/m$^2$ per day. If more organic protection layers and inorganic layers were formed, as in Example 4, the water vapor transmission rate can be further lowered to 0.0036 g/m$^2$ per day. In addition, despite that the full spectrum transmittance of the low water-vapor permeable composite films is reduced with the increased water-vapor barrier performance, the lowest transmittance was still higher than 80%. Thus, one skilled in the art would choose suitable materials according to design requirements, for tuning the water vapor transmission rate and the full spectrum transmittance of low water-vapor permeable composite film to a desired level. From the above description, it can be known that the low water-vapor permeable composite film may have high transparency, excellent water-vapor barrier and is flexible. In addition, the low water-vapor permeable composite film is light and can be fabricated easily. Thus, the low water-vapor permeable composite film is extremely suitable for being used as the water-vapor barrier layer of optoelectronic devices.

While the preferred embodiments of the disclosure have been described above, it will be recognized and understood that various modifications can be made in the invention and the appended claims are intended to cover all such modifications which may fall within the spirit and scope of the invention.

What is claimed is:

1. A composite film, comprising:
   a 3-layered co-extruded biaxial-oriented film formed of polyester films or polypropylene films comprising a first layer, a second layer and a third layer stacked in sequence;
   an alternating layer structure comprising a plurality of organic protection layers and a plurality of inorganic layers, wherein the alternating layer structure is formed on the 3-layered co-extruded biaxial-oriented film, wherein the plurality of organic protection layers and the plurality of inorganic layers are stacked alternately, and the inorganic layers are formed by atom layer deposition, wherein each of the organic protection layers is formed of polyvinylidene chloride, polyvinylalcohol, ethylene-vinylalcohol copolymer, transparent esters or combinations thereof or each of the organic protection layers is a polymer layer which is cross-linked by multi-functional monomers and oligomers, wherein the multi-functional monomers comprise acrylate, epoxy acrylate, urethane acrylate, or combinations thereof;
   wherein when the 3-layered co-extruded biaxial-oriented film is formed of polyester films, the first layer comprises polyethylene terephthalate, glycol-modified polyethylene terephthalate, acid-modified polyethylene terephthalate, glycol-modified polycyclohexanedimethylene terephthalate or combinations thereof, the second layer comprises poly(ethylene terephthalate), poly(propylene terephthalate), polybutylene terephthalate, polyethylene naphthalate or combinations thereof, and the third layer comprises polyethylene terephthalate, glycol-modified polyethylene terephthalate, acid-modified polyethylene terephthalate, glycol-modified polycyclohexanedimethylene terephthalate or combinations thereof, and the first layer further comprises an anti-block agent, wherein the third layer has a lower viscosity than the second layer,
   wherein when the 3-layered co-extruded biaxial-oriented film is formed of polypropylene films, the first layer comprises polypropylene, ethylene-propylene copolymer, ethylene-propylene-butylene copolymer or combinations thereof, the second layer comprises polypropylene, ethylene-propylene copolymer or combinations thereof, and the third layer comprises polypropylene, ethylene-propylene copolymer, ethylene-propylene-butylene copolymer or combinations thereof, and the first layer further comprises an anti-block agent, wherein the third layer has a lower viscosity than the second layer;
   wherein the first layer has a thickness of between about 1 μm and about 5 μm, the second layer has a thickness of between about 13 μm and about 240 μm, and the third layer has a thickness of between about 1 μm and about 5 μm.

2. The composite film of claim 1, wherein the lowest layer of the plurality of the inorganic layers is directly disposed on the third layer of the co-extruded biaxial-oriented film.

3. The composite film of claim 1, wherein the uppermost layer of the alternating layer structure is one of the plurality of organic protection layers.

4. The composite film of claim 1, wherein the plurality of the inorganic layers comprises aluminum oxide, zinc oxide, zirconium oxide, silica, indium nitride, or combinations thereof.

5. The composite film of claim 1, wherein each layer of the plurality of the inorganic layers has a thickness of between 120 atomic layers and 200 atomic layers.

6. The composite film of claim 1, wherein the polymer layer is polymerized by the multi-functional monomers, the oligomers and an initiator reagent through heating or UV irradiation.

7. The composite film of claim 6, wherein the initiator reagent comprises a radical initiator selected from the group consisting of benzophenone, 1-hydroxy-cyclohexylphenyl-ketone and diphenyl(2,4,6-trimethylbenzoy)phosphine oxide) or a cation initiator selected from the group consisting of diarylindonium salts, triaryl sulfonium salts, ferrocinium complexes and aryl diazonium.

8. The composite film of claim 1, wherein the anti-block agent comprises silica, magnesium silicate, polysiloxane, polytetrafluoroethene or combinations thereof, wherein the anti-block agent has a concentration of between about 300 ppm and about 2000 ppm.

9. The composite film of claim 1, wherein the third layer does not comprise an additive or dopants therein.

10. The composite film of claim 1, wherein the composite film is flexible.

11. The composite film of claim 1, wherein the composite film has a water vapor transmission rate of less than 0.02 g/m$^2$ per day.

12. The composite film of claim 1, wherein the composite film has a full spectrum optical transmittance of greater than 80%.

13. A packaging structure comprising:
   an optoelectronic device; and
   the composite film of claim 1, which is adhered to the optoelectronic device.

14. The packaging structure of claim 13, wherein the optoelectronic device is wrapped by the composite film.

15. The packaging structure of claim 13, wherein the optoelectronic device comprises an OLED, thin-film solar cell, dye-sensitized solar cell, e-paper or combinations thereof.

16. The packaging structure of claim 13, wherein the composite film has a water vapor transmission rate of less than 0.02 g/m$^2$ per day and a full spectrum optical transmittance of greater than 80%.

* * * * *